(12) United States Patent
Byrne

(10) Patent No.: US 10,278,076 B2
(45) Date of Patent: Apr. 30, 2019

(54) SYSTEM AND METHOD FOR CONTROLLING, MONITORING AND RECORDING OF WIRELESS TELECOMMUNICATIONS SERVICES IN PENAL INSTITUTIONS

(71) Applicant: Brian Francis Byrne, Plano, TX (US)

(72) Inventor: Brian Francis Byrne, Plano, TX (US)

( * ) Notice: Subject to any disclaimer, the term of this patent is extended or adjusted under 35 U.S.C. 154(b) by 0 days.

(21) Appl. No.: 15/700,144

(22) Filed: Sep. 10, 2017

(65) Prior Publication Data

US 2017/0374554 A1  Dec. 28, 2017

Related U.S. Application Data

(60) Division of application No. 14/945,145, filed on Nov. 18, 2015, now Pat. No. 9,794,788, which is a division of application No. 13/931,850, filed on Jun. 29, 2013, now Pat. No. 9,271,145, which is a
(Continued)

(51) Int. Cl.
| | |
|---|---|
| *H04M 1/66* | (2006.01) |
| *H04W 12/08* | (2009.01) |
| *H04W 12/00* | (2009.01) |
| *G06Q 50/26* | (2012.01) |
| *H04L 29/06* | (2006.01) |
| *H04W 12/02* | (2009.01) |
| *H04M 3/38* | (2006.01) |
| *H04M 3/22* | (2006.01) |

(Continued)

(52) U.S. Cl.
CPC ............ *H04W 12/08* (2013.01); *G06Q 50/26* (2013.01); *H04L 63/101* (2013.01); *H04L 63/30* (2013.01); *H04L 67/306* (2013.01); *H04M 1/67* (2013.01); *H04M 3/2281* (2013.01); *H04M 3/38* (2013.01); *H04W 12/00* (2013.01); *H04W 12/02* (2013.01); *H04M 2203/6081* (2013.01)

(58) Field of Classification Search
None
See application file for complete search history.

(56) References Cited

U.S. PATENT DOCUMENTS

| 8,478,234 B1 * | 7/2013 | Byrne | H04M 3/2281 |
| | | | 455/406 |
| 9,271,145 B2 * | 2/2016 | Byrne | H04W 12/00 |
| 9,794,788 B2 * | 10/2017 | Byrne | H04W 12/00 |

(Continued)

*Primary Examiner* — Erika A Washington

(57) ABSTRACT

A system for controlling, monitoring, and recording of wireless telecommunications services associated with penal institutions is provided comprising a portable electronic device and application executing on the device that present a listing of available call destinations based on receiving a first instruction from a first authorized party possessing the device. The application receives a second instruction comprising a choice of a first call destination from the listing. The application transmits a third instruction requesting connection with the destination and joins a second authorized party associated with the first call destination in a first voice session. The application joins the first authorized party to the first session. The application further joins the first party to a second voice session initiated by the second party based on determining that the second party initiated the second session from the first destination. The device originates and receives transmissions solely upon approval of the application.

7 Claims, 2 Drawing Sheets

Related U.S. Application Data continuation-in-part of application No. 13/313,135, filed on Dec. 7, 2011, now Pat. No. 8,478,234.

(60) Provisional application No. 61/441,161, filed on Feb. 9, 2011.

(51) Int. Cl.
*H04L 29/08* (2006.01)
*H04M 1/67* (2006.01)

(56) References Cited

U.S. PATENT DOCUMENTS

2011/0065375 A1* 3/2011 Bradley ............ H04M 1/72577 455/1
2014/0273929 A1* 9/2014 Torgersrud .......... H04M 15/886 455/406

* cited by examiner

200

Start

↓

202 — Create a first profile for a first detainee, the first profile linked to a first schedule file, a first permitted parties file, and a first accounts file associated with the first detainee.

↓

204 — Assign a previously unassigned portable electronic device to the first profile.

↓

206 — Provide the portable electronic device to the first detainee for use subject to limitations described at least in the first profile.

↓

208 — Create a second profile for a second detainee, the second profile linked to a second schedule file, a second permitted parties file, and a second accounts file associated with the second detainee.

↓

210 — Cancel assignment of the portable electronic device to the first profile.

↓

212 — Provide the portable electronic device to the second detainee for use subject to limitations described at least in the second profile.

↓

End

FIG. 2

SYSTEM AND METHOD FOR CONTROLLING, MONITORING AND RECORDING OF WIRELESS TELECOMMUNICATIONS SERVICES IN PENAL INSTITUTIONS

CROSS REFERENCE TO RELATED APPLICATIONS

This application is a divisional of U.S. patent application Ser. No. 14/945,145 filed on Nov. 18, 2015 now patented as U.S. Pat. No. 9,794,788, which claims the benefit of U.S. Pat. No. 9,271,145 issued on Feb. 23, 2016, which claims the benefit of U.S. Pat. No. 8,478,234 issued on Jul. 2, 2013. The application claims the benefit of U.S. Provisional Application No. 61/441,161 filed Feb. 9, 2011 which is incorporated by reference in its entirety.

FIELD OF THE DISCLOSURE

The present disclosure is in the field of telecommunications services. More particularly, the present disclosure is in the technical field of wireless telecommunications services provided to detainees in penal institutions.

BACKGROUND OF THE DISCLOSURE

Detainees in jails, penitentiaries and other penal facilities seeking telephone contact with outside parties such as family members typically use public pay telephones provided by the facilities. Such telephones are located in common areas of a penal facility and provide little privacy for the detainee. Penal officers must oversee the movement of detainees to the telephone area. Officers also oversee a plurality of detainees waiting in line for telephone access in close contact with each other, a situation presenting safety risks for officers and detainees. Prison telephone usage is generally limited to outgoing calls only that are usually collect to the called party and often expensive.

Pay telephones in penal facilities are also limited in number due to space and cost limitations as well as manpower requirements associated with moving and guarding detainees using the phones. The limited quantity of phones, long waiting lines, limited call duration, and supervisory manpower requirements may result in higher financial and other costs to management of penal facilities. These factors also negatively impact detainee quality of life and safety of detainees and penal employees.

Contraband mobile telephones have become an increasing problem in penal facilities, further reducing penal facility earnings, compromising safety and presenting opportunities for penal employee corruption. While penal officials have taken steps to reduce contraband mobile phones, the expanded capabilities of small portable devices have made such devices more valuable to detainees. This has increased economic incentives for penal employees to facilitate the smuggling and trafficking of these devices in prisons.

With a contraband mobile device that has Internet access, a detainee may view telephone directories, maps and photographs for criminal purposes. Gang violence and drug trafficking are increasingly being managed online, allowing persons in penal facilities to continue engaging in criminal activity while incarcerated. Traditional solutions such as blocking or jamming cell phone signals have proven impractical.

SUMMARY OF THE DISCLOSURE

In an embodiment, a system for controlling, monitoring, and recording of wireless telecommunications services associated with penal institutions is provided. The system comprises a portable electronic device and an application that, when executed on the portable electronic device, presents a listing of available call destinations based on receiving a first instruction from a first authorized party in possession of the portable electronic device. The application also receives a second instruction comprising a choice of a first call destination from the listing. The application also transmits a third instruction requesting connection with the first call destination. The application also joins a second authorized party associated with the first call destination in a first voice session. The application also joins the first authorized party to the first voice session, wherein the application further joins the first authorized party to a second voice session initiated by the second authorized party based on the application determining that the second authorized party initiated the second voice session from the first call destination and wherein the portable electronic device originates and receives transmissions solely upon approval of the application.

In an embodiment, a method of remotely reassigning detainee profiles to portable electronic devices in penal institutions is provided. The method comprises creating a first profile for a first detainee, the first profile linked to a first schedule file, a first permitted parties file, and a first accounts file associated with the first detainee. The method also comprises assigning a previously unassigned portable electronic device to the first profile. The method also comprises providing the portable electronic device to the first detainee for use subject to limitations described at least in the first profile. The method also comprises creating a second profile for a second detainee, the second profile linked to a second schedule file, a second permitted parties file, and a second accounts file associated with the second detainee. The method also comprises cancelling assignment of the portable electronic device to the first profile. The method also comprises providing the portable electronic device to the second detainee for use subject to limitations described at least in the second profile.

In an embodiment, a system for monitoring and controlling wireless telecommunications services in penal institutions is provided. The system comprises a processor, a memory, and an application, that, when executed on the processor monitors activities engaged in by a plurality of detainees using portable electronic devices in at least one penal facility. The system also determines that a first monitored activity engaged in by a first detainee violates at least one rule associated with the at least one penal facility. The system also remotely disables a first portable electronic device in possession of the first detainee in response to a command entered in to one of a monitoring station associated with the application and an official portable electronic device associated with the application and in possession of a penal facility official.

BRIEF DESCRIPTION OF THE DRAWINGS

FIG. 2 depicts a flowchart of a method of remotely reassigning detainee profiles to portable electronic devices in penal institutions

DETAILED DESCRIPTION OF THE INVENTION

Figure 1:
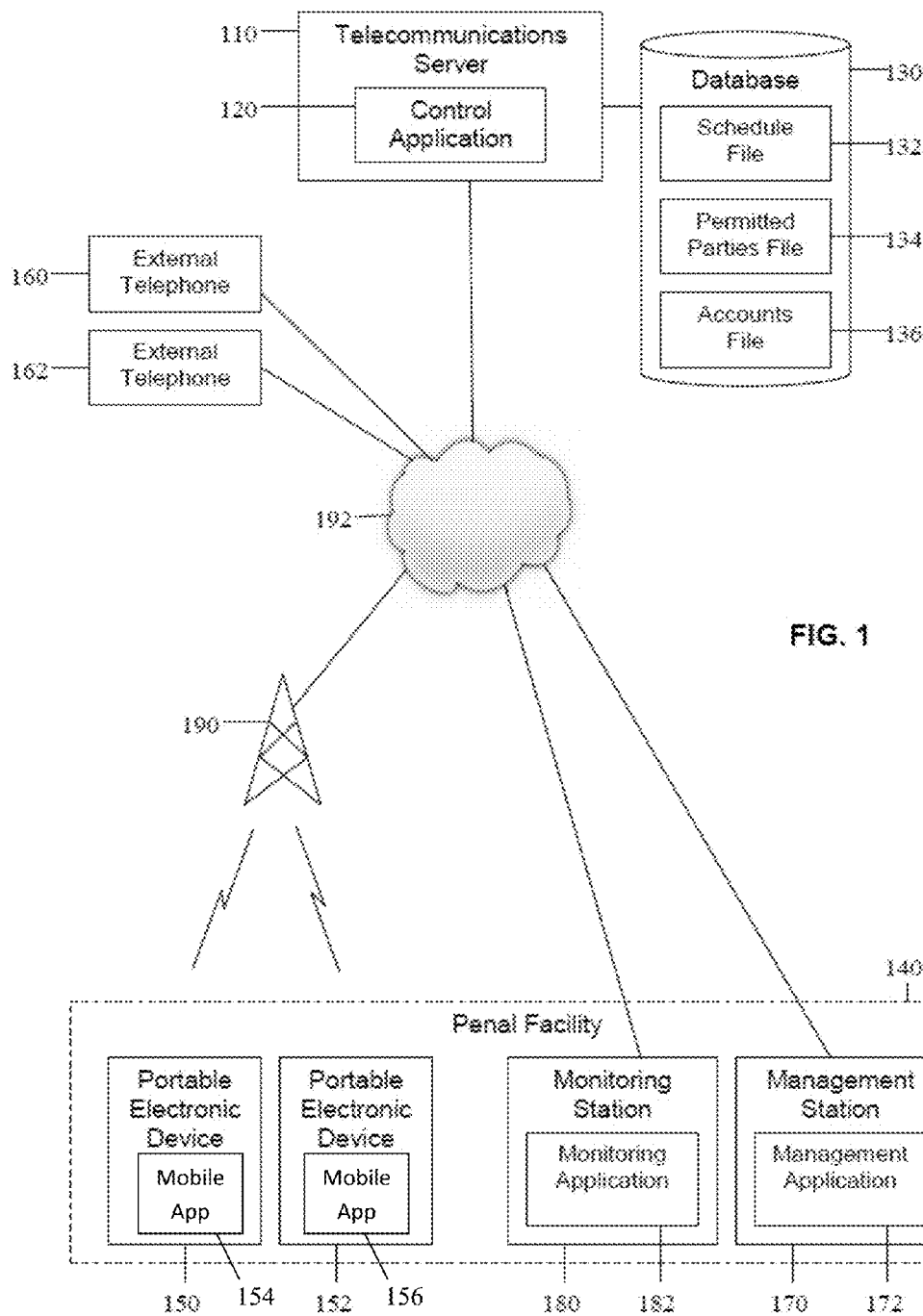
FIG. 1 depicts a block diagram of a system for controlling, monitoring, and recording of wireless telecommunications services associated with penal institutions in accordance with an embodiment of the present disclosure.

The present disclosure teaches systems and methods of providing incoming and outgoing telecommunications services to persons incarcerated in penal facilities. A plurality of controls is provided herein that may reduce contraband devices and encourage good behavior by detainees, penal employees, and others. Portable electronic devices, primarily mobile telephones, are provided to detainees that have exhibited acceptable behavior and are not determined to be security risks. The devices are configured to allow only transmissions with a single telephone number associated with an application taught herein. After applying controls, the application then connects outside calling parties to the detainee or connects the calling detainee to the destination party. In contrast to existing implementations, inbound calls to a detainee are permitted.

The application executes on a computer, for example a private branch exchange (PBX) that may be located on the premises of a penal institution or away from the penal institution. A family member, attorney, or other preapproved party calling from a preapproved telephone number and telephone initiates a call to a telephone number associated with the application. The calling party is asked to enter a name or other identification of the detainee with whom they wish to speak. The calling party speaks or otherwise enters this information. The application consults stored records listing names and other identifying information of detainees permitted to receive incoming calls from external calling parties. The application verifies that the detainee is included in these records and is permitted to receive incoming calls from approved external calling parties and telephones on that day of the week and during that time period. The application also verifies that the calling party and originating external telephone number are included in a list of preapproved calling parties and telephone numbers. The application finally verifies that sufficient funds are in a detainee account to pay for the incoming call. Once the application has completed these verification steps, the application then places a separate call to a specially modified portable electronic device in possession of the detainee. When the detainee answers, the application joins the separate call legs and remains on the line, recording the call. The application monitors the call for unusual activity such as the external calling party allowing a different party to join the call or attempting to switch the call to a different telephone or number or conference another number into the call. The incoming call is timed and the detainee's account is charged. The call may also be monitored by at least one authorized person who may join, interrupt or terminate the call at any time.

The present disclosure also teaches a detainee making outgoing calls in a similar manner as with incoming calls. A detainee provided a portable electronic device taught herein makes a keypad entry that contacts the PBX. The PBX receives this transmission and the application executing thereon consults stored records describing permitted days and times for outgoing calls by the detainee. The stored records also list the destination telephone numbers of parties, for example family members or an attorney, that the detainee is permitted to call at the allowed times. The stored records also contain account information for the detainee regarding calling minutes remaining and/or available funds on deposit to pay for phone usage.

After determining that the detainee's request is on a permitted day and within a permitted time period and that minutes and funds are available, the application consults the list of permitted recipient telephone numbers. The detainee may be provided the list and/or may enter or speak the desired name or telephone number he or she wishes to call. The application then calls the designated recipient telephone number and if the individual with which the detainee wishes to speak is available, the application connects the detainee with the called party, for example the detainee's spouse or children.

As with incoming calls, the detainee and the called party may remain connected as two separate call legs with the application remaining on the line and actively monitoring the conversation. The call may be subject to time limitations associated with program rules or based on account balances. The application may interrupt or terminate the conversation at any time and an authorized person may "barge in" if necessary. All conversations are recorded and are subject to review.

The portable electronic device provided to the detainee is locked down to prevent tampering or hacking. It is securely configured to place and receive calls only with a single telephone number associated with the application taught herein executing on the PBX. The portable electronic device is unable to engage in any short message service (SMS) messaging, commonly referred to as text messaging, and cannot access any Internet services. The only actions permitted with the device are placing calls to and receiving calls from the one number associated with the application and specific to the device. The device is physically secured such that it cannot be opened or otherwise tampered with. The device may be configured to allow its movements to be tracked within and/or outside a penal facility. This feature may be especially useful when portable electronic devices are provided to persons in work release programs.

By providing deserving detainees telephone privileges that they may use in the safety and privacy of their cells or living areas, the system and methods of the present disclosure may reduce contraband cell phones in penal facilities by removing incentives for penal employees to engage in corrupt behavior. The legitimate provision of incoming and outgoing telephone service to deserving detainees may result in less temptation for penal employees to become derelict or corrupt by assisting in the smuggling of contraband devices into penal facilities.

The systems and methods taught herein may also reduce the need for public telephones in penal facilities that may only be used for outgoing collect calls and present security risks. With public phones, detainees must physically leave their secure areas and wait in line. Public phones are also often very expensive which may be a burden on family members or others that must pay the collect phone charges. The present disclosure provides fairer and more private systems for deserving detainees wherein incentives for penal employee corruption are reduced and overall penal facility safety may be enhanced.

Turning to FIG. 1, a system 100 of controlling, monitoring and recording of wireless telecommunications services in penal institutions is provided. The system 100 comprises a telecommunications server 110, a control application 120, a database 130, a penal facility 140, portable electronic devices 150, 152, external telephones 160, 162, a management computer 170, a monitoring computer 180, a base transceiver system 190, and a network 192.

The telecommunications server 110 is a software-based telecommunications system server or private branch exchange (PBX) capable of receiving, switching, placing and monitoring voice and data transmissions. The telecommunications server 110 may be situated at the penal facility 140 or may be situated elsewhere, for example on the premises of a central office or other facility of a telecommunication services provider. The telecommunications server 110 may provide the services described herein to more than one penal facility 140.

The control application 120 executes on the telecommunications server 110 and provides the primary services associated with voice telecommunications services taught herein for persons incarcerated in or associated with the penal facility 140. The control application 120 maintains a file of unique telephone numbers called by detainees from the portable electronic devices 150, 152 provided them. Each portable electronic device 150, 152 is registered by the control application 120 to a unique extension on the telecommunications server 110. The control application 120 allows calls from the portable electronic device 150 to the unique extension assigned to it in the telecommunications server 110.

The portable electronic device 150 as configured and provided to the detainee cannot receive calls from any number other than the number associated with the unique extension securely configured for it in the telecommunications server 110. Likewise, the portable electronic device 150 cannot place calls to any other number other than the number associated with the unique extension. The control application 120 receives calls from external telephones 160, 162 wherein the calls are placed by family members, attorneys or other persons approved to place calls to certain detainees. The external telephones 160, 162 may use wired or wireless connections and their calls may be transmitted via the Internet using a protocol such as Voice Over Internet Protocol (VoIP).

The control application 120 employs various methods to ensure that the device originating the call to the telecommunications server 110 is in fact the approved external telephone 160 and not an impostor or other device. The control application 120 may analyze the initial and continuing electronic stream associated with the call from the external telephone 160 and may extract and analyze the International Mobile Equipment Identifier (IMEI) or other identifying data contained in these transmissions. The control application 120 may compare the extracted data with information stored in the telecommunications server 110 or elsewhere for verification. The control application 120 may employ other well known techniques to validate that the call is originated by the external telephone 160 and by a person authorized to place calls to detainees. The control application 120 may require the caller to enter information provided only to the caller and may use caller identification and voice recognition software or other tools to determine that the person calling from the external telephone 160 is in fact an authorized caller. The control application 120 also starts a recording of some or all of these interactions.

After ascertaining that the call to the telecommunications server 110 was in fact originated by the external telephone 160 and after determining that the caller is authorized to place calls to detainees, the control application 120 instructs the caller to provide the name and/or other identifying information for the detainee they wish to call. The control application 120 then performs a series of additional steps before connecting the caller to the detainee. The control application 120 analyzes a schedule file 132 stored in the database 130 to determine days of the week and times of day that the detainee is permitted to receive incoming calls. In an embodiment, some scheduling information may be stored locally in the portable electronic device 150. The portable electronic device 150 may be configured such that it cannot receive externally originated transmissions of any kind outside of permitted calling times.

After the control application 120 determines that the calling request is at an allowed time, the control application 120 consults a permitted parties file 134 stored in the database 130 describing detainees that the external telephone 160 and associated person may call. In an embodiment, an attorney may be authorized to call more than one detainee. The permitted parties file 134 contains information about detainees including names and other identification that is used to assure that only authorized detainees may receive calls. The permitted parties file 134 may also identify the portable electronic device 150 assigned to a particular detainee at a particular time. Portable electronic devices 150, 152 may be rotated among detainees at random times for security reasons.

As noted, the calling party using the external telephone 160 is instructed to enter the name or other identification of the detainee with which the calling party wishes to speak. The control application 120 checks this against the permitted parties file 134. The calling party may provide selection information by keypad entry or verbally. The control application 120 may alternatively present a listing viewable on the external telephone 160 of allowed detainees that the external telephone 160 the authorized caller may call. This is predicated on the external telephone 160 having functionality to display this information and accept selections of items of this information.

When the control application 120 determines that calls to the selected detainee are permitted at that time by the calling party, the control application 120 dials the portable electronic device 150 in the possession of the detainee. This is done with the external telephone 160 not yet on the line. The call from the external telephone 160 to the detainee may be completed as two separate call legs by the control application 120. The initial call by the external telephone to the telecommunications server 110 may be a first call leg that is held by the telecommunications server 110. The control application 120 then initiates a second call leg to the portable electronic device 150 in the possession of the detainee. When the portable electronic device 150 is answered and the control application 120 determines that the person answering is the detainee, the control application 120 then links the two call legs, effectively bringing the calling party into the call. The control application 120 remains present to monitor the call.

While the call is ongoing, the telecommunications server 110 or another device take steps to assure that the detainee and the approved caller remain on the call and do not allow unauthorized persons to participate in the call. These steps may include the use of voice recognition software or technology that detects if the calling party attempts to transfer the call to another telephone number or device.

Before connecting the calling party with the detainee, the control application 120 additionally consults an accounts file 136 stored in the database 130 to determine a quantity of minutes and/or funds presently available for use by the detainee. Management of the penal facility 140 may set policies limiting call durations or minutes of permitted usage per day, per weeks or during another time period. Detainees may be charged per minute used for outgoing as well as incoming calls. Detainees may deposit funds into accounts accessible by the control application 120. In an embodiment, a detainee may be extended credit.

The present disclosure also provides for detainees to originate outgoing calls to family members, attorneys, and other authorized persons under certain conditions with method steps similar to those used in completing incoming calls to detainees. As with incoming calls, only authorized external telephones 160, 162 and persons associated with those external telephones 160, 162 are permitted to receive outgoing calls originated by detainees during specific time periods. In an embodiment, the group of external telephones 160, 162 and parties that are permitted to receive outgoing calls from the detainee may differ from the external telephones 160, 162 and associated numbers and parties that are permitted to call the detainee in incoming calls.

The detainee seeking to call an external telephone 160 calls the telephone number associated with the control application 150 and the telecommunications server 110. This is the only telephone number that the detainee may call using the portable electronic device 150. In an embodiment, the detainee may enter press the keypad numeral 1 or make another entry to initiate an outgoing call. The control application 120 receives the call, checks the schedule file 132, the permitted parties file 134, and the accounts file 136 as it does with incoming calls. The control application 120 ascertains that the day and time of the call are permitted. The control application 120 also determines that the external telephone 160, its associated phone number and the person receiving the outgoing call from the detainee are permitted and that there are funds and/or minutes available in the detainee's account. Once these requirements are determined to be met, the control application 120 calls the external telephone 160 associated with the destination party. As with incoming calls, the control application 120 completes outgoing calls as two separate call legs and remains on the line recording the call and monitoring it for prohibited activity including participation by unauthorized parties in the call.

The system 100 also comprises at least one management station 170 that is a computer used by persons with management responsibilities and associated access privileges to manage the control application 120 and various aspects of the calling program provided herein. These persons are provided system administrator privileges that include the authority to add and remove detainees to and from the calling program and make various changes to calling privileges. System administrators and others provided access to the management station 170 access a management application 172 executing at least partially on the management station 170. They use the management application 172 to configure the control application 120 and manipulate files stored in the database 130. In addition to adding, removing and changing detainee calling privileges, schedules and accounts, these actions comprise adding and deleting phone numbers of external telephones 160, 162 and associated persons authorized to speak with detainees. System administrators may use a browser as a "front end" or client software tool provided by the management application 172 to access the control application 120, the database 130 and other components. The management application 172 may provide simplified web forms to add detainees and make other program changes. System administrators may be wardens, senior correction officials, or others that develop and implement policies regarding program administration as a whole.

The system 100 also comprises at least one monitoring station 180 that may be a computer used by authorized persons to listen to outgoing or incoming detainee calls on a live or recorded basis. These authorized persons may also use a monitoring application 182 executing at least partially on the monitoring station 180 that comprises electronic tools used in forensic activities made possible by the teachings of the present disclosure. These activities include assisting in the detection of prohibited behavior by detainees, outside parties, and others including penal officers who may be violating or compromising penal facility regulations. The monitoring station 180 may be located on the premises of the penal facility 140 or elsewhere. The monitoring application 182 may also use a browser to access information useful in performing this analysis. As with the management application 172, this may involve accessing some areas of the control application 120 and the database 130.

The present disclosure also provides for client administrator privileges to be provided to users of the monitoring station 180. These privileges are less broad than system administrator privileges and include selectively monitoring calls, accessing tools to analyze usage patterns, and managing and inventorying portable electronic devices 150, 152 within and outside the penal facility 140. Monitoring may include passive listening to calls as well as "barge in" wherein a client administrator or system administrator may intervene in the call and speak to one or more parties to the call.

In an embodiment, the management station 170 and the monitoring station 180 may be the same physical computer. The management station 170 and the monitoring station 180 are general purpose computers. In an embodiment, there may exist a plurality of management stations 170 and monitoring stations 180. While the management station 170 and the monitoring station 180 are depicted in FIG. 1 as being contained within the penal facility 140, in an embodiment these components may be located elsewhere. In an embodiment, some individuals may be provided access rights to the control application 120, the database 130 and other components that combine aspects of system administrator privileges and client administrator privileges.

The portable electronic devices 150, 152 may be mobile telephones, personal digital assistants (PDA), media players or other wireless devices capable of originating and receiving voice transmissions. As noted, portable electronic devices 150, 152 are configured to have contact with only a single telephone number associated with the control application 120 executing on the telecommunications server 110. The detainee using the portable electronic device 150 hears various messages provided by the control application 120, for example a warning that an inbound or outbound call will soon terminate because of funds or schedule limitations. In an embodiment, portable electronic devices 150, 152 and limited areas of the control application 120 may be accessible by the detainee to obtain information such as detainees' current account balances and permitted calling schedules. In an embodiment, detainees are provided voice mail accounts protected by personal identification numbers (PIN). Voice mail functionality may be used by management of the penal facility 140 to provide general distribution messages and announcements to individual detainees and groups of detainees. Detainees cannot delete voice mail messages and authorized persons may listen to voice mail messages.

The limitations to and other aspects described herein of the portable electronic devices 150, 152 may be configured directly into the devices. They may alternatively or in addition be configured from a remote computer such as the management station 170 or other device. The portable electronic devices 150, 152 are physically configured such that they cannot be physically opened and the subscriber identification modules (SIM) therein cannot be removed or otherwise tampered with. They may bear visible insignia that designate them as legitimate portable electronic devices 150, 152 associated with the program taught herein.

The portable electronic devices 150, 152 may be configured with global positioning system (GPS) functionality so that their physical movement within or outside the penal facility 140 may be monitored. In an example, a first detainee with the portable electronic device 150 may be housed in a first cellblock and work as an assistant in the warden's office of the penal facility 140. A second detainee with the portable electronic device 152 may be housed in a second cellblock and work in the laundry of the penal facility 140. The first and second detainees may rarely or never move in the same areas of the penal facility 140 or be in the same areas at specific known times. Movements of the portable electronic devices 150, 152 may be tracked using GPS or other technology such that unusual activity may be detected and investigated.

The present disclosure also teaches the use of portable electronic devices 150, 152 as provided herein by persons not confined to the penal facility 140 but instead subject to parole or in a work release program. Offenders not physically incarcerated but subject to significant correctional oversight may be provided portable electronic devices 150, 152 for use in parole and work release programs. GPS and other tracking technology incorporated into the portable electronic devices 150, 152 may be useful in enforcing physical movement restrictions on non-incarcerated offenders.

The penal facility 140 is a secure building or buildings comprising a penal institution used to incarcerate individuals as detainees subject to court-imposed sentences. The penal facility 140 may be a penitentiary, prison, jail, camp, detention center or other facility operated by a federal, state, provincial, municipal, military or other public body or agency. The penal facility 140 may alternatively be privately operated under contract with a court, correctional agency or other public body. In an embodiment, the penal facility 140 may be a public hospital or other institution in which non-offending persons reside as wards of a state, province, municipality or other public body.

The systems and methods of the present disclosure may provide a fairer, safer and less corruption-prone alternative to prison telephone systems commonly in use. As taught herein, detainees may not have to be physically moved to place and receive calls as they must be in the case of public phones in prisons, an enhancement to detainee and penal employee safety. Detainees therefore do not have to wait in line for phones, a situation that may create increased tension between detainees being in close physical proximity to each other. Detainees are able to engage in calls in safety and privacy of their living quarters. Detainees are able to receive incoming calls, which is generally not possible with existing prison phone systems. Detainees are relieved of the burden of making collect calls that are often very expensive to the party accepting charges.

Detainees in penal facilities 140 demand and have a right to telephone services and have historically demonstrated that they will find ways to satisfy this demand using legitimate means or not. Providing contraband mobile telephones to inmates of penal facilities and allowing their trafficking is a temptation to penal employees when financial or other incentives are offered. The systems and methods taught herein that legitimately satisfy demand for communications services for deserving detainees may remove much of the economic incentive that may result in corruption of prison employees. The program taught herein reduces the exposure to corrupting influences on prison employees. It also encourages and rewards good behavior by detainees and may ultimately reduce recidivism given the increased amount of telephone contact and enhanced quality of voice interaction facilitated with family members and others.

In an embodiment, aspects of the systems and methods taught herein may execute on the portable electronic device 150. A combination of hardware and software components resident and executing on the portable electronic device 150 may work in conjunction with the control application 120 and the telecommunications server 110. For outgoing calls by detainees, an application executing on the portable electronic device 150 may dial a first telephone number in response to receiving a first key entry by a detainee. The application may then display a menu presenting a list of destination telephone numbers. It receives a second key entry comprising a selection of a first destination telephone number from the displayed menu listing destination telephone numbers. The application then transmits a request to initiate a voice communication session with the first destination telephone number based on receiving the second key entry.

The systems and methods of the present disclosure teach the provision of telecommunications services to detainees incarcerated in and otherwise associated with the penal facility 140. Lawful wireless and other communications by employees of and visitors to the penal facility 140 as well as other non-detainees are not affected by the actions of the components provided herein. In addition, the systems and methods of the present disclosure teach that wireless communication nodes and other similar wireless signal detecting and managing devices need not be placed on the premises of the penal facility 140.

In an embodiment, selected functionality of the control application 120 may execute on the portable electronic device 150. The system 100 also comprises a mobile app 154, 156 that resides and executes on the portable electronic device 150, 152, respectively. The mobile app 154, 156 performs selected functions of the control application 120. The mobile app 154 may access the files accessed by the control application 120 in other embodiments to determine whether a detainee is permitted to originate or receive a call. The files accessed by the mobile app 154 include the schedule file 132, the permitted parties file 134, and the accounts file 136. In an embodiment the schedule file 132, the permitted parties file 134, and the accounts file 136 may be stored on the portable electronic device 150 with updates periodically pushed to the portable electronic device 150 by the control application 120 or otherwise updated by the control application 120.

The mobile app 154 may receive a first instruction from a first authorized party who is in possession of the portable electronic device 150 and desiring to place an outgoing call. The first authorized party may be a detainee in the penal facility 140 who has received authorization to originate telephone calls to certain outside parties under specified conditions. The outside parties may be in possession of external telephones 160, 162. The first authorized party is provided the portable electronic device 150 to use in originating and/or receiving telephone calls, subject to the specified conditions rules and subject to parameters of the schedule file 132, the permitted parties file 134, and the accounts file 136. The first instruction may be a key entry or series of key entries to a keypad of the portable electronic device 150. The first instruction may additionally or alternatively be a voice command spoken to the portable electronic device 150.

Upon receiving the first instruction, the mobile app 154 executing on the portable electronic device 150 accesses the schedule file 132 and the accounts file 130 in a manner similar to that of the control application 120 in other embodiments. Whether the schedule file 132 and the accounts file 136 are stored fully or partially on the portable electronic device 150 or are stored in the database 130 as in other embodiments, the mobile app 154 accesses these files to determine, as in other embodiments, whether the first authorized party, the detainee, may originate a call at that time and on that day. The mobile app 154 may determine from the schedule file 132 whether the first authorized party is permitted to originate a call at the present time. The mobile app 154 may also determine from the accounts file 136 whether the first authorized party presently has a sufficient funds balance to originate a call.

If the mobile app 154 determines from its examination of the schedule file 132 and accounts file 136 that the first authorized party may originate a call, the mobile app 154 then presents a listing of available call destinations to the first authorized party. The mobile app 154 may access the listing from the permitted parties file 134 that may be stored on the portable electronic device 150, in the database 130, or partially in each device. The mobile app 154 may present the listing visually in a display of the portable electronic device 150 or may present the listing in an audible manner. The mobile app 154 then receives from the first authorized party, the detainee, a second instruction comprising a choice of a first call destination from the listing generated from the permitted parties file 134. The first authorized party chooses from the listing the first call destination, the name or destination telephone number associated with the external telephone 160 that the first authorized party wishes to call. The first authorized party made provide the second instruction in the form of a key entry or a spoken command.

The mobile app 154 then transmits a third instruction requesting connection with the first call destination. The control application 120 receives the third instruction from the mobile app 154 and dials the first call destination. The control application 120 determines whether the party answering at the first call destination is authorized to speak with the first authorized party. If so, the answering party, referred to in this embodiment as the second authorized party, is instructed to stay on the line while the control application 120 joins the call to the portable electronic device 150. The mobile app 154 receives a message from the control application 120 that the second authorized party is on the line. The mobile app 154 then joins the first authorized party, the detainee, to the second authorized party and the detainee and family member, attorney, or other person authorized as the second authorized party commence and conduct their voice conversation subject to the controls and monitoring described in the previous embodiments.

The present embodiment, wherein functionality previously disclosed as executed by the control application 120 on the telecommunications server 110 is instead executed by the mobile app 154, is similar to the previous embodiments in which effectively two calls or sessions are separately originated and then joined. The two calls are only joined when determinations are satisfactorily made about authorizations of the originating party and the destination party and their full compliance with requirements. The call or session initiated by the first authorized party is not joined with the call or session initiated by the control application 120 with the second authorized party at the first call destination until the control application 120 and the mobile app 154 determine that all conditions associated with the first authorized party originating the call have been met and that the identity of the outside person, the second authorized party, has been established and cleared.

The presently discussed embodiment wherein the mobile app 154 handles functions previously described as handled by the control application 120 also includes calls originated externally and directed to the first authorized party, the detainee. In this case of calls coming from the outside and intended for the detainee, the control application 120 may receive the incoming call from the external telephone 160 of the outside party and contact the mobile app 154. In this case the control application 120 and the mobile app 154 may coordinate the processes of checking the schedule file 132 and the accounts file 136 and thereafter the permitted parties file 134 before permitting the first authorized party to be joined to the calling outside party.

In either the outbound calling or inbound call receiving cases of the presently discussed embodiment, the portable electronic device 150 originates or receives calls solely upon approval of the mobile app 154. Functionality described in previous embodiments as that of the control application 120 may reside on the portable electronic device 150 and be executed by the mobile app 154.

The portable electronic device 150 may generate at least one of a text messaging alert and an electronic mail alert if the portable electronic device 150 or other device detects that the portable electronic device 150 has been physically or electronically tampered with. Although text messaging and electronic mail are not available to a detainee provided the portable electronic device 150 for voice usage, those services may reside on the portable electronic device 150 for sending these alerts. The detainee cannot detect the presence of or access those services. The portable electronic device 150 may also be automatically disabled upon detection by the portable electronic device 150 or other device that the portable electronic device 150 has been physically or electronically tampered with which may include removal of the subscriber identity module (SIM) installed in the portable electronic device 150.

The control application 120 may be contacted by the mobile app 154 via one of a telephone number, an Internet Protocol (IP) address, and a Media Access Control (MAC) address associated with the control application 120.

A first subscriber identity module (SIM) installed in the portable electronic device 150 may be modified to permit transmissions only to a predetermined telephone number associated with the first instruction. The first SIM may become inoperable when not used in the portable electronic device 150. The portable electronic device 150 may be unable to engage in outgoing or incoming calls when the first SIM is not installed.

The portable electronic device 150 may be verifiable as non-contraband at least by one of locally reading an International Mobile Station Equipment Identity (IMEI) of the portable electronic device 150. The portable electronic device 150 may be also verifiable as non-contraband by manually verifying a non-removable application executing on the portable electronic device 150 that provides a digital validator or watermark. Further, the portable electronic device 150 may be verifiable as non-contraband and by an officer of the penal facility 140 entering a keypad entry on the portable electronic device 150 that returns a unique validation response verifiable by the officer.

Turing to FIG. 2, a method 200 of remotely reassigning detainee profiles to portable electronic device 150, 152 in penal institution is provided. Beginning at block 202, a computer, which may be the telecommunications server 110, creates a first profile for a first detainee, the first profile linked to a first schedule file, a first permitted parties file, and a first accounts file associated with the first detainee. In an embodiment, the first schedule file, the first permitted parties file, and the first accounts are the schedule file 132, the permitted parties file 134, and the accounts file 136, respectively, of the system 100. At block 204, the computer assigns a previously unassigned portable electronic device 150 to the first profile. At block 206, the computer provides the portable electronic device 150 to the first detainee for use subject to limitations described at least in the first profile. At block 208, the computer creates a second profile for a second detainee, the second profile linked to a second schedule file, a second permitted parties file, and a second accounts file associated with the second detainee. At block 210, the computer cancels assignment of the portable electronic device 150 to the first profile. At block 212, the computer provides the portable electronic device to 150 the second detainee for use subject to limitations described at least in the second profile.

A profile created for a particular detainee may be linked to specific areas of the schedule file 132, the permitted parties file 134, and the accounts file 136 associated with that detainee. Alternatively, specific instances of the schedule file 132, the permitted parties file 134, and the accounts file 136 may be created for the particular detainee.

Assignments of profiles for detainees to portable electronic device 150, 152 may be remotely activated and cancelled. These actions may be taken using the management station 170 and/or the monitoring station 180. Remote reassignment of detainee profiles to portable electronic device 150, 152 and rotation of portable electronic device 150, 152 among detainees as provided in the method 200 may take place upon retaking possession of the portable electronic device 150, 152. Reassignment of detainee profiles to the portable electronic device takes place on at least one of a scheduled basis, on an emergency basis, on an ad hoc basis.

The control application 120 may remotely disable the portable electronic device 150 in possession of the detainee based on a command entered into the management station 170 and/or the monitoring station 180. The control application 120 may additionally or alternative remotely disable the portable electronic device 150 in possession of the detainee based on a command entered into an official electronic device (not shown in FIG. 1) in possession of an official of the penal facility 140 wherein the official's electronic device sends a message to at least one of the control application 120, the management station 170 and the monitoring station 180. The message may be sent as a text message or an electronic mail message. These actions may take place based upon a determination by the official or the control application 120 or other component that a monitored activity engaged in by the detainee violates at least one rule of the penal facility 140.

For example, a guard may carry the official portable electronic device and may disable the portable electronic device 150 in possession of the detainee by entering a command that sends a message. The message is sent to at least one of the control application 120, the management station 170 and the monitoring station 180 whereupon another message is sent from at least one of those devices to the portable electronic device 150 in possession of the detainee that disables the portable electronic device 150.

The monitored activity by the detainee referred to above that may result in disabling of the portable electronic device 150 in possession of the detainee may be a voice transmission received or transmitted by the portable electronic device 150. The monitored activity may be a keypad entry entered into the portable electronic device 150. The monitored activity may be at least one physical movement of the portable electronic device 150.

The control application 120, the management station 170, and/or the monitoring station 180 may remotely disable a plurality of portable electronic devices 150, 152 that are located in at least one physical area of the penal facility 140. Remote disabling of multiple portable electronic devices 150, 152 may take place based on a command received from a guard or other official carrying the electronic device (not shown in FIG. 1) described previously.

The control application 120, the management station 170, and/or the monitoring station 180 may accept a plurality of commands to remotely disable a plurality of portable electronic devices 150, 152 in detainee possession. For example, a particular group or classification of detainees may need to be selectively cut off from use of portable electronic devices 150, 152 in their possession for security or other reasons.

The portable electronic device 150 may be manually or automatically disabled when detected via cell tower signaling activity to have been moved from a predetermined area. This may apply to the portable electronic device 150 being in possession of a person not confined to the penal facility 140 but subject to a work release program.

In an embodiment, the portable electronic device 150 may generate a text message or electronic mail message and be automatically disabled upon detection that the portable electronic device 150 has been physically or electronically tampered with. The detainee in possession of the portable electronic device 150 would be unable to access text messaging and electronic mail messaging functionality of the portable electronic device 150 and would be unaware that these services are present on the portable electronic device 150.

In an embodiment, portable electronic devices 150, 152 may be provided with global positioning system (GPS) capabilities so that detainee movement may be monitored. Specifically, congregation of some detainees may not be permitted and such congregation may be detected and prevented. Such monitoring may be done from the management station 170 and/or the monitoring station 180.

Detainees may purchase additional time to be loaded into their accounts files 136 by approaching kiosks located at the penal facility. Detainees may also download updates to the schedule file 132 and the permitted parties file 134 in this manner.

What is claimed is:

1. A system for monitoring and controlling wireless telecommunications services in penal institutions, comprising:
    a processor
    a memory; and
    an application, that, when executed on the processor;
        monitors activities engaged in by a plurality of detainees using portable electronic devices in at least one penal facility,
        determines that a first monitored activity engaged in by a first detainee violates at least one rule associated with the at least one penal facility, and one of locally and remotely modifies the access profile associated with a first portable electronic device in possession of the first detainee in response to a command entered in to one of a monitoring station associated with the application and an official portable electronic device associated with the application and in possession of a penal facility official.

2. The system of claim 1, wherein the first monitored activity comprises one of a voice transmission one of received by and transmitted by the portable electronic device, a keypad entry entered into the portable electronic device, and at least one physical movement of the portable electronic device.

3. The system of claim 1, wherein the application one of locally and remotely modifies the access profiles associated with a plurality of portable electronic devices in at least a first physical area of the penal facility.

4. The system of claim 1, wherein the command entered into the official portable electronic device is one of a text message and an electronic mail message to the application.

5. The system of claim 1, wherein the monitoring station and the official portable electronic device accept a plurality commands to selectively modify the access profiles associated with a plurality of portable electronic devices in detainee possession.

6. The system of claim 1, wherein the access profile associated with the first portable electronic device is automatically modified when detected in connection with cell tower signaling activity to have been moved from a predetermined physical area.

7. The system of claim 1, wherein the first portable electronic device generates at least one of a text message and an electronic mail message and the access profile associated with the first portable electronic device is automatically modified upon detection of at least one of electronic tampering and physical tampering of the first portable electronic device.

* * * * *